Oct. 13, 1931.  R. HOFSTETTER  1,827,198
THREADING APPARATUS
Filed Dec. 15, 1927
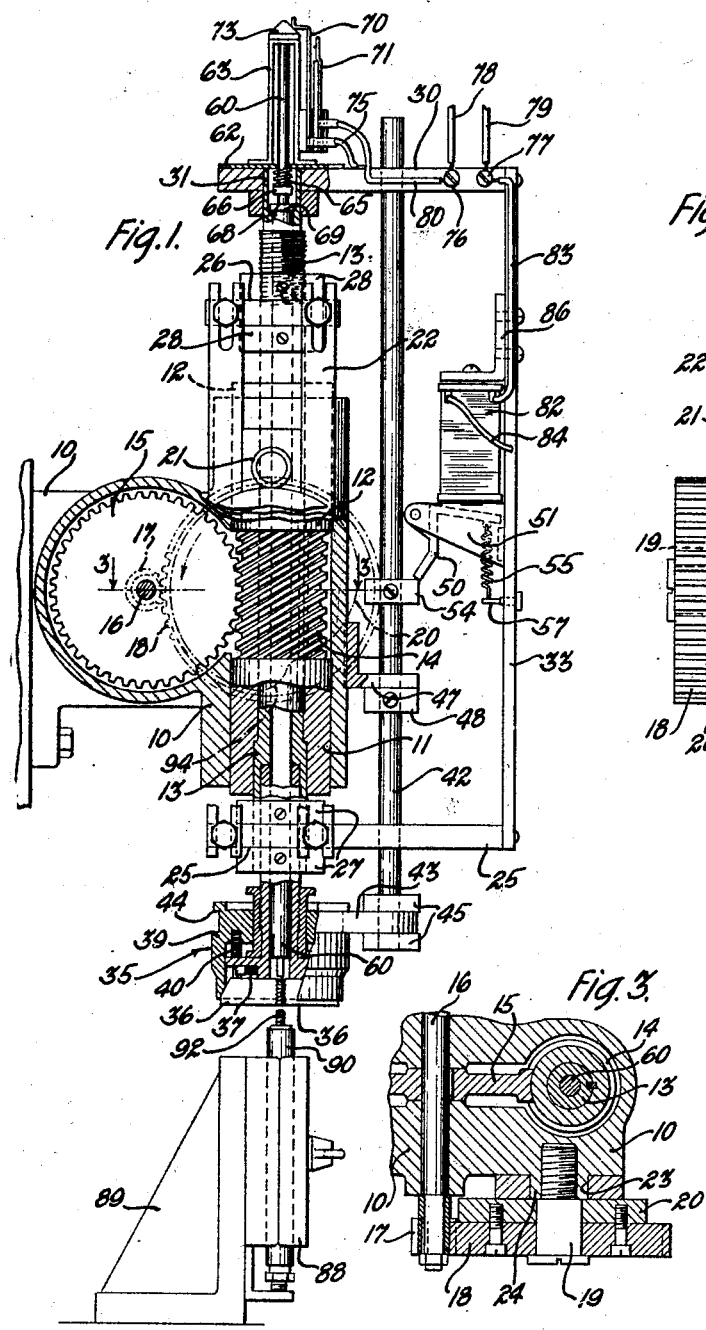
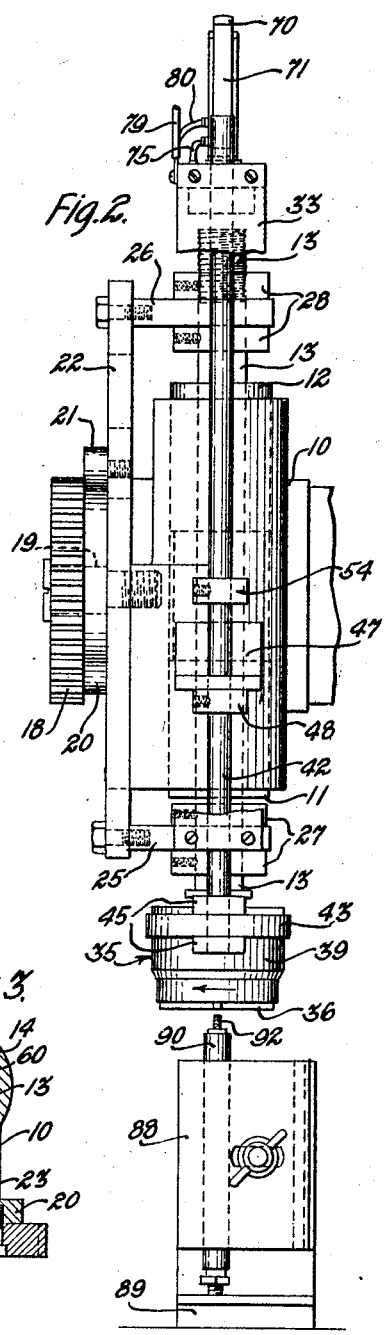
Inventor
Robert Hofstetter
by N. A. Patton, Att'y Patented Oct. 13, 1931

1,827,198

UNITED STATES PATENT OFFICE

ROBERT HOFSTETTER, OF DOWNERS GROVE, ILLINOIS, ASSIGNOR TO WESTERN ELECTRIC COMPANY, INCORPORATED, OF NEW YORK, N. Y., A CORPORATION OF NEW YORK

THREADING APPARATUS

Application filed December 15, 1927. Serial No. 240,111.

This invention relates to threading apparatus, and more particularly to improvements in apparatus for rethreading articles.

The principal object of the invention is the provision of a simple and inexpensive apparatus for efficiently and expeditiously threading articles to a predetermined extent.

In accordance with the general features of the invention, there is provided in one embodiment thereof an apparatus for threading articles comprising a self-opening die carried upon the lower end of a vertically disposed hollow spindle within which a pilot rod is operated when the threading has proceeded to a predetermined point to cause the energization of an electromagnet. The operation of the electromagnet releases a spring pressed latch member which allows the springs in the die to become effective for opening the die and permits it to be rapidly elevated by a cam.

Other features and advantages of the invention will become apparent from the following detailed description, reference being had to the accompanying drawings, wherein Fig. 1 is a front elevation, partly in section, of a rethreading apparatus embodying the features of the present invention, a portion of the supporting frame being broken away in order to clearly illustrate the more essential features of the invention;

Fig. 2 is a side elevation of the apparatus shown in Fig. 1, and

Fig. 3 is a fragmentary detailed section taken on line 3—3 of Fig. 1.

Referring now to the drawings, in which similar reference characters denote similar parts throughout the several views, the reference numeral 10 indicates a suitable supporting frame shown partly broken away in order to more clearly illustrate the essential parts of the invention. Mounted within the frame 10 are bushings 11 and 12 within which a vertically disposed hollow spindle 13 is rotatably journaled. Interposed between the bushings 11 and 12 is a spiral worm 14 which is keyed to the spindle 13 in such manner that the spindle is vertically slidable therein. The spindle 13 is driven through the spiral worm 14 by a spiral gear 15 secured to a horizontally disposed drive shaft 16 which, in turn, may be driven from any suitable source of power (not shown). Secured to the shaft 16 is a pinion 17 which drives a gear 18 rotatably mounted upon a stud 19 secured to the frame 10. Attached to or formed integral with the gear 18 is a cam 20 which engages a roller 21 carried by a vertical slide 22. The slide 22 is provided with an elongated vertical slot 23 which engages a rectangular raised portion 24 of the frame 10 (Fig. 3). The spindle 13 is interconnected with the slide 22 so as to be vertically movable therewith by means of horizontal cross pieces 25 and 26 which are rigidly fixed to the spindle by retaining collars 27—27 and 28—28, respectively, secured to the spindle.

A horizontal cross piece 30 is attached to a reduced upper end portion 31 of the spindle 13 (Fig. 1) and secured to the cross pieces 25 and 30 is a vertically disposed supporting bar 33. A threading die indicated generally by the reference numeral 35 is attached to the lower end of the spindle 13 so as to be rotatable therewith. As shown in the drawing, the threading die 35 may be of any usual construction wherein the chasers 36 thereof are held in their open or inoperative positions by individually associated compression springs 37. The chasers 36 are moved to their closed or operative positions by a slidable outer sleeve 39 which when moved downwardly engages cam surfaces formed upon the outer ends of the chasers. Compression springs 40 suitably mounted within the die head serve to normally move the sleeve 39 upwardly so that the chasers 36 are free to move outwardly to their open positions.

In accordance with the present invention, mechanism independent of the threading die is provided for holding the threading die in its closed or operative position and for permitting the die to be opened by the compression springs 40 when the threading has proceeded to a predetermined depth. As best shown in Fig. 1, the outer sleeve 39 of the threading die is operatively interconnected with a vertically slidable bar 42 by means of a horizontal connecting link 43. One end of the link 43 is bifurcated and engages an external groove 44 provided in the outer sleeve 39 of the threading die, and the opposite end of the connecting link is secured to the vertical bar 42 by means of spaced retaining collars 45—45 secured to the bar. The bar 42 is slidable in suitable apertures provided in the upper and lower cross pieces 30 and 25, respectively, and is supported intermediate its ends by a bracket 47 secured to the frame 10. A collar 48 secured to the bar 42 and adapted to engage the underside of the bracket 47 serves to limit the upward movement of the bar.

Referring to Fig. 1, it will be obvious that the threading die 35 is closed when the spindle 13 is moved upwardly with respect to the bar 42. The threading die is held in its closed position by a latch member 50 pivoted upon a bracket 51 secured to the supporting bar 33 and adapted to engage a collar 54 secured to the bar 42. A tension spring 55 serves to normally hold the latch member in engagement with the collar 54. One end of the spring 55 is secured to the latch member 50 and its opposite end is attached to a pin 57 secured to the supporting bar 33. It will be obvious from the construction just described that when the latch member 50 is disengaged from the collar 54 the compression springs 40 within the die head become effective for moving the outer sleeve 39 of the die together with the vertical bar 42 upwardly, thus permitting the spring pressed chasers 36 to move outwardly to their open positions.

The electromagnetic means for disengaging the latch member 50 to permit the opening of the die when the threading has proceeded to a predetermined depth will next be described. Slidably mounted within the hollow spindle 13 is a pilot rod 60, the lower end of which extends into the threading die, as best shown in Fig. 1. The upper end portion of the pilot rod protrudes from the upper end of the spindle 13 and extends through an apertured plate 62 and an inverted U-shaped bracket 63 secured to the cross piece 30 (Fig. 1). A compression spring 65 encircling the pilot rod 60 and interposed between the plate 62 and a collar 66 secured to or formed integral with the pilot rod serves to normally urge the pilot rod downwardly, which movement is limited by a collar or enlarged portion 68 of the pilot rod engaging the bottom of a recess 69 formed in the spindle.

Mounted upon the bracket 63 are a pair of electrical contact springs 70 and 71 which are arranged to be electrically interconnected, when the pilot rod 60 is moved upwardly, by an enlarged cone-shaped head 73 formed upon the upper end of the pilot rod. The contact spring 70 is grounded through the machine framework by means of an electrical conductor 75 electrically interconnecting it with the cross piece 30. A pair of electrical terminals 76 and 77 mounted upon the cross piece 30 and insulated therefrom are connected to a suitable source of electrical energy (not shown) by means of conductors 78 and 79. The terminal 76 is electrically interconnected with the contact spring 71 by an electrical conductor 80 and the terminal 77 is electrically interconnected with one terminal of an eletromagnet 82 by means of an electrical conductor 83. The other terminal of the electromagnet is grounded through the machine framework by an electrical conductor 84 electrically interconnecting it with the supporting bar 33. The electromagnet 82 is supported by a bracket 86 secured to the bar 33 and is positioned to disengage the latch member 50 from the collar 54 when it is energized by the completion of the electrical circuit just described.

The operation of the above described apparatus is as follows: The part upon which the threading or rethreading operation is to be performed is rigidly secured within a suitable clamping device 88 which may be supported by a bracket 89 secured to the top of a table or bench (not shown). In the drawing, a tubular fuse 90 of the type employed in telephone systems is shown supported within the clamping device 88 in position to have a rethreading operation performed upon the protruding threaded end portion 92 of the stem thereof, which threaded portion is sometimes unavoidably covered with solder when soldering the fuse tape which is inside of the tubular sleeve 90, to the stem 92.

Referring particularly to Fig. 1, it will be understood that the spindle 13 is continuously rotated by the spiral worm 14 and gear 15. The cam 20 is rotated in the direction indicated by the arrow and is designed to allow the spindle 13, together with the threading die and the other parts carried thereby, to move downwardly of their own weight and at the desired speed according to the pitch of the threading or rethreading which is to be performed. As the threading die 35 moves downwardly upon the upper end portion 92 of the tubular fuse, the rethreading operation is performed and when the rethreading has proceeded to a predetermined depth the pilot rod 60 is moved upwardly due to the engagement of the lower end thereof with the upper end of the fuse stem 92 being threaded or rethreaded. This upward movement of the pilot rod causes the cone-shaped head 73 thereof to move the contact spring 70 outwardly into electrical engagement with the contact spring 71, thus completing the above described electrical circuit including the electromagnet 82 whereupon it will be understood that the electromagnet becomes energized and attracts the latch member 50 causing it to become disengaged from the collar 54, thus permitting the compression springs 40 within the die head to move the outer sleeve 39 upwardly allowing the spring pressed chasers 36 to move outwardly to their open positions. Immediately thereafter, the threading apparatus is rapidly elevated by an abrupt raised portion 94 of the cam 20 (Fig. 1) and at the same time the pilot rod 60 is moved downwardly by the spring 65, thus reopening the electrical circuit and causing the de-energization of the electromagnet 82 whereupon the spring pressed latch member 50 is again free to engage the collar 54. As the apparatus approaches the end of its upward travel, the bar 42, together with the outer sleeve 39 of the threading die, are caused to come to a stop due to the engagement of the collar 48 with the bracket 47, whereupon the continued upward movement of the spindle causes the spring pressed chasers to be moved inwardly by the outer sleeve 39, as hereinbefore described. At the same time, the latch member 50 is again engaged with the collar 54 thus completing one cycle of the operation of the apparatus.

Although the invention as herein illustrated and described is particularly suitable for use in conjunction with the manufacture of tubular fuses employed in telephone systems, it should be understood that the novel features of the invention are capable of other applications within the scope of the appended claims.

What is claimed is:

1. In a threading apparatus, a rotatable hollow spindle, a self-opening threading die carried thereby, means including a spring pressed latch member for normally holding the threading die in its closed position, an electrical circuit including an electromagnet for rendering the latch member ineffective, and a pilot rod slidably mounted within the spindle and actuated by the part being threaded to close the electrical circuit when the threading has proceeded to a predetermined point.

2. In a threading apparatus, a threading die revolvably mounted on a hollow spindle, a spring acting upon internal surfaces thereof for opening the die, a movable rod mounted integrally of the threading die, a latch member engaging the rod whereby the spring is rendered inoperative to open the die, a normally-open electrical circuit for controlling the action of the latch member, and a pilot rod positioned internally of the hollow spindle for closing the electrical circuit when the threading has proceeded to a predetermined point.

3. In a threading apparatus, a rotatable hollow spindle, a self-opening threading die carried thereby, means for normally holding the threading die in its closed position, said means comprising a movable rod operatively connected to the die, a collar mounted upon the rod, a latch for engaging with the collar, an electrical circuit including an electromagnet for actuating the latch, and means mounted within the spindle and actuated by the part being threaded for closing the electrical circuit to render the electromagnet effective when the threading has proceeded to a predetermined point.

In witness whereof, I hereunto subscribe my name this 29th day of November, A. D. 1927.

ROBERT HOFSTETTER.